June 6, 1961 C. E. BRANSCOMB 2,987,181

SIMPLIFIED COLLATOR

Filed June 30, 1958 7 Sheets-Sheet 1

INVENTOR
CHARLES E. BRANSCOMB

BY
Francis V. Giolma
ATTORNEY

June 6, 1961 C. E. BRANSCOMB 2,987,181

SIMPLIFIED COLLATOR

Filed June 30, 1958 7 Sheets-Sheet 3

June 6, 1961 C. E. BRANSCOMB 2,987,181

SIMPLIFIED COLLATOR

Filed June 30, 1958 7 Sheets-Sheet 4

June 6, 1961 C. E. BRANSCOMB 2,987,181

SIMPLIFIED COLLATOR

Filed June 30, 1958 7 Sheets-Sheet 5

United States Patent Office 2,987,181

Patented June 6, 1961

2,987,181

SIMPLIFIED COLLATOR

Charles E. Branscomb, Endwell, N.Y., assignor to International Business Machines Corporation, New York, N.Y., a corporation of New York Filed June 30, 1958, Ser. No. 745,512

15 Claims. (Cl. 209—110)

This invention relates generally to record card collators, and it has reference in particular to a simplified record card handling and data sensing mechanism.

As is well known to persons familiar with the art, record card controlled machines for collectively associating and disassociating record cards being advanced from a plurality of paths, are known as collators. One typical such collator is described in U.S. Patent No. 2,359,670, which issued on October 3, 1944, to R. E. Page, and is one which can perform a variety of operations, such as filing or merging, matching and selecting cards in different arrangements.

The collator described hereinafter operates in somewhat the same manner but is of a more simplified construction than the Page machine and has numerous advantages thereover.

Generally stated, therefore, it is an object of this invention to provide a simplified form of collator that is inexpensive to manufacture and is reliable and efficient in operation.

More specifically, it is an object of the present invention to provide a collator having a single pair of read stations for in-flight reading of record card data on both primary and secondary record cards.

Another object of the invention is to provide in a collator for having a common feed with a single pair of data reading stations for primary and secondary cards, and for bringing a card to rest and storing it at a station in said feed so that a subsequent card may be moved ahead of the stored or at rest card.

Yet another object of this invention is to provide in a collator for using a common card feed with card storage means and a single pair of data reading means for primary and secondary cards, and selectively utilizing data storage means in connection with one of the reading means for record card data comparing under the control of the card storage means.

Also, an important object of this invention is to provide in a collator for using a single pair of data reading means in a common card path, and for having record card storage means associated with the card path for storing a card at rest whenever a particular card feed is of the same type as the previous one.

Another object of the invention is to provide in a collator for using a single pair of data reading means in a common card feed together with a storage device selectively controlling the connections of one or the other of two compare units therewith, depending on whether or not a record card is being held in the storage device associated with the common card feed.

In practicing the present invention in accordance with the preferred one of its embodiments, separate card feeds advance primary and secondary cards into a common record card feed having a pair of reading means. The common feed has a controllable portion providing a station for storing a record card at rest and a deflector for directing a subsequent card into a bypass station and around a stored card into one of a plurality of pockets which are controlled by selector magnets. A data storage unit stores data from the second reading means, and data from the two reading means or from one reading means, and the storage unit is used in conjunction with record card feed data from primary and secondary card feed type registers to control the feed of primary and secondary cards, depending on whether or not a card is stored in the storage station of the common feed.

Other objects of the invention will be pointed out in the description and claims and illustrated in the accompanying drawings, which disclose, by way of examples, the principle of the invention and the best mode, which has been contemplated, of applying that principle.

I.—GENERAL DESCRIPTION

Figure 1:
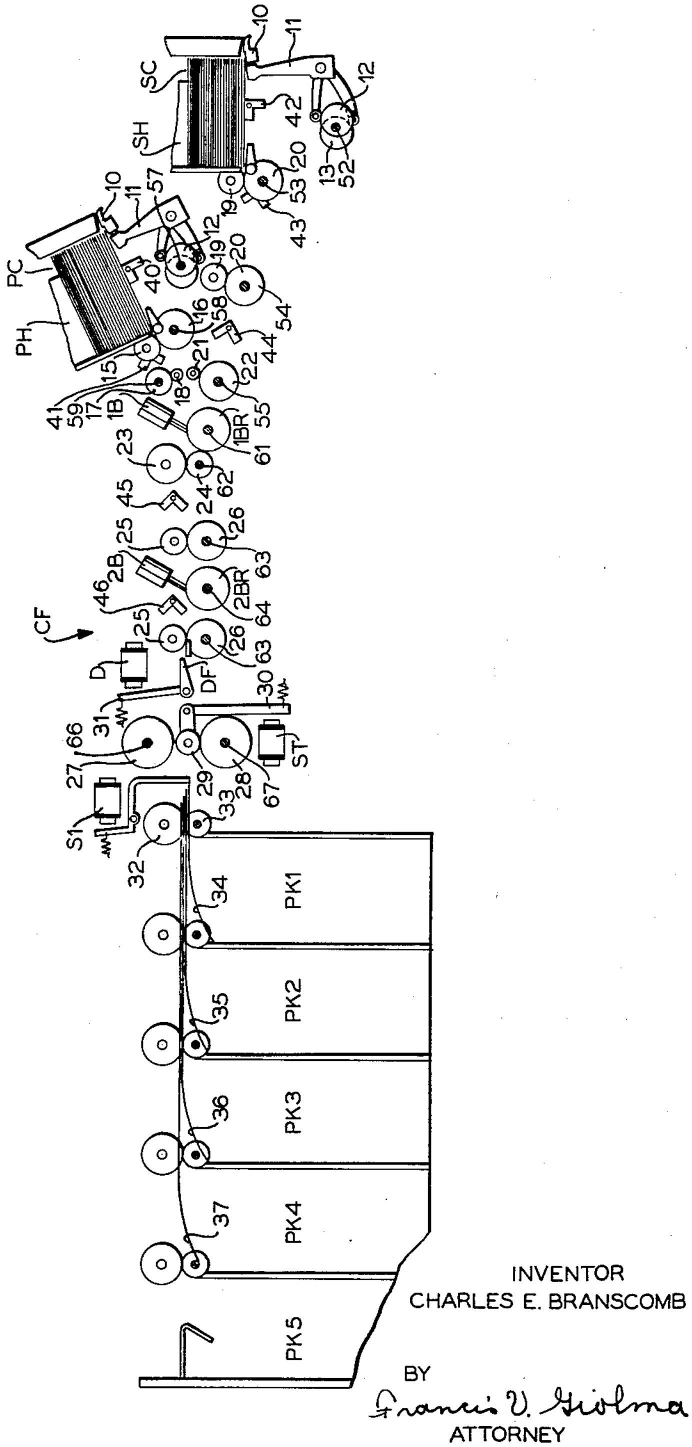
FIG. 1 is a schematic view in side elevation of a simplified collator embodying the principles of the invention.

Referring to FIG. 1 of the drawings, it will be seen that the collator comprises generally primary and secondary record card feeds including a primary card hopper PH and a secondary card hopper SH for feeding primary cards PC and second cards SC, nine edge first, into a common card feed CF having a pair of reading means or stations, such as a plurality of brushes, one for each column, represented by brushes 1B and 2B for sensing columns of data on the cards, to determine into which of a plurality of pockets PK1 to PK5 the cards are to be deposited.

Each of the primary and secondary hoppers are provided with a picker 10 operated by a cam lever 11 driven by cams 12 and 13 for feeding cards from the respective hoppers. The primary feed comprises pairs of feed rolls 15—16 and 17—18 for selectively feeding cards from the primary hopper PH to the common card feed. The secondary card feed comprises pairs of associated drive rolls 19—20 and 21—22 for likewise feeding cards from the secondary hopper SH into the common card feed.

The common card feed comprises pairs of feed rolls 23—24 and 25—26 for advancing cards to a store station which utilizes a pair of spaced apart feed rolls 27—28, which are continuously driven along with the other feed rolls of the common card feed, including feed rolls 32—33 for advancing cards to the pockets. Feed of cards through these rolls is speeded up, either by faster shaft drive, or by making rolls 27 and 28 approximately 1.667 times the diameter of roll 26, in order to feed either a bypassing card or one from storage, clear of a following card. The brushes 1B and 2B are each associated with brush rolls 1BR and 2BR, respectively, for sensing data on cards being advanced through the common card feed.

In order to provide for storing a card in the storage station of the common feed, means, such as a controllable feed roll 29, is disposed intermediate the feed rolls 27 and 28, which rotate in opposite directions, and is operated by means of a store magnet ST and an armature lever 30 for selectively engaging either one or the other of the feed rolls 27 and 28, it being normally biased to engage the feed roll 28, and activated by the magnet ST to engage the feed roll 27. Immediately ahead of the feed roll 29 a deflector DF is provided for selectively deflecting cards between the feed rolls 28—29 and 27—29. The deflector DF is pivotally mounted and disposed to be actuated by an armature 31 lever under the control of a deflector magnet D for deflecting cards upwardly to a bypass station between the feed rolls 27 and 29, so as to be fed thereby whenever the control feed roll 29 is activated to engage the feed roll 27 and for the purpose of removing the feed from, and storing a record card in and at rest in the store station between the feed rolls 28—29.

The pockets PK1 to PK5 are provided with a plurality of deflectable chute guide blades 34—37 which may be activated by means of magnets, such as the selector magnet S1 which when energized deflects the chute blade 34 downward to deflect cards from the pocket PK1 into the pocket PK2. Each of the other blades 35, 36 and 37 are similarly controlled by other selector magnets, such as S2 and S3 shown in FIG. 8, in substantially the same manner as the magnet S1 controls the chute blade 34.

Figure 2:
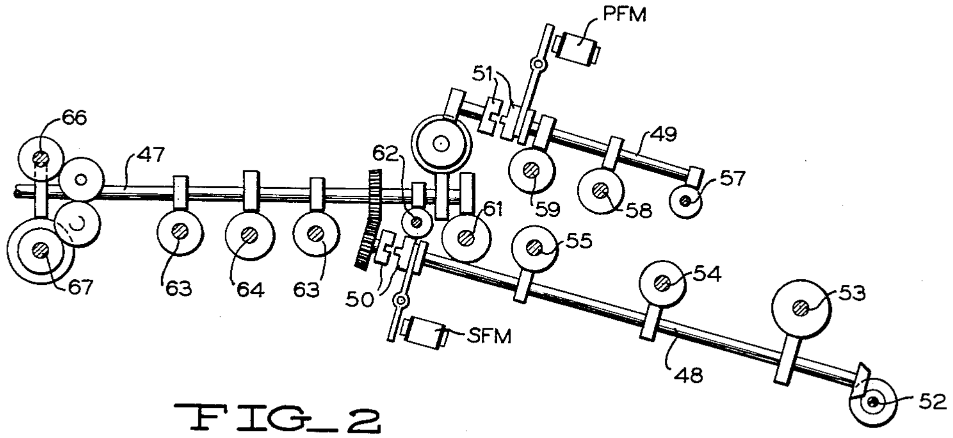
FIG. 2 is a partial schematic side elevational view of the drive mechanism for the collator of FIG. 1.

Referring to FIGS. 1 and 2, it will be seen that the common feed rolls 23—24, 25—26, 27—28 and 32—33 may, if desired, be driven from a continuously running drive shaft 47 driven by a suitable motor (not shown). The brush roll 1BR is driven from a shaft 61 in a driving relation with the shaft 47, and feed rolls 23—24 and 25—26 are likewise driven by the shafts 62 and 63. Brush roll 2BR is driven by a shaft 64, while the feed rolls 27—28 are driven by means of shafts 66 and 67, respectively. Feed rolls 32—33 may be continuously driven, for example, from shaft 62.

The primary feed is provided with a drive shaft 49 for driving shafts 57, 58 and 59 which operate the picker cams 12—13, feed rolls 15—16 and feed rolls 17—18 of the primary feed, respectively. The shaft 49 is operatively connected to the shaft 47 by means of a clutch 51 under the control of a primary feed magnet PFM. The secondary feed is similarly provided with a drive shaft 48 for driving shafts 52, 53, 54 and 55 for operating the secondary picker cams 12—13, feed rolls 19—20 and 21—22, respectively. The drive shaft 48 is operatively connected to the drive shaft 47 by means of a clutch 50 under the control of a secondary feed magnet SFM. The primary feed is provided with a primary hopper card lever contact 40, a primary throat card lever contact 41, and the secondary feed is provided with a secondary hopper card lever contact 42, a secondary throat card lever contact 43 and a secondary feed card lever contact lever 44 situated between the feed rolls 19—20 and 21—22. Card lever contacts 45 and 46 are also provided in the common card feed following the brushes 1B and 2B, respectively.

II.—CONTROL RELAYS

Figure 3:
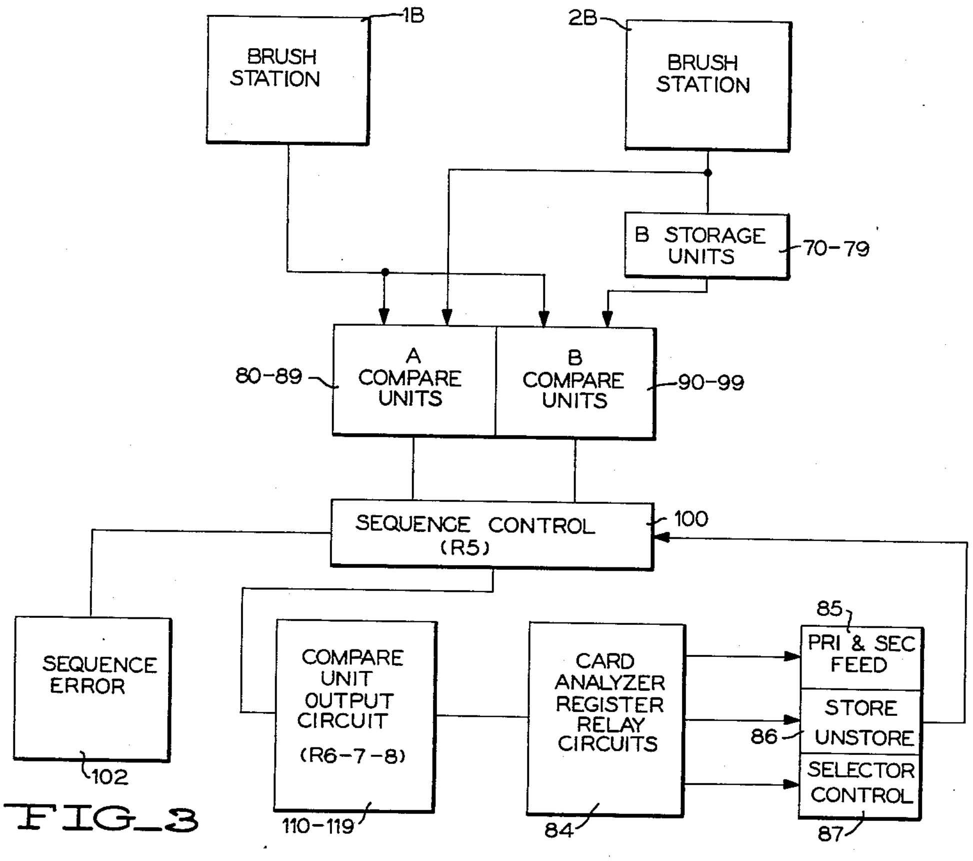
FIG. 3 is a functional block diagram illustrating the mode of operation of the collator of FIG. 1.

Referring generally to FIG. 3, it will be seen that record card data sensed by the different brushes at the 1B and 2B brush stations is fed from the 1B station to A and B compare units designated by the numerals 80 and 89 and 90 to 99, respectively, there being one compare unit in each of the A and B units for each column of data compared. This showing is on the basis of ten columns of comparison, which may be taken as typical. Information from brushes at the 2B brush station is fed into the A compare unit and a *b* storage unit 70—79, which supplies information to the B compare unit one cycle later. The A and B compare units are selectively connected under the control of a sequence control unit 100 to a comparison output circuit 110—119 and to a sequence error circuit 102, depending on whether or not a card is being held in storage, the A unit being connected to the comparison output circuits 110—119 and the B unit to the sequence error circuit 102 when no card is in storage, these connections being interchanged by sequence control

100 whenever a card is stored. Information from the compare output circuits 110—119 is then fed into card analyzer register 84 which determines the type of card whether a primary or a secondary in each of the positions at the 1B brush station, the 2B brush station and in the storage station, or in the bypass station on its way to the pockets. The resultant information is then used to effect operation of the primary and secondary feed unit 85, the store unit 86 and the selection control unit 87 in a manner which will hereinafter be described in detail.

III.—RELAYS AND FUNCTIONS

Figure 4:
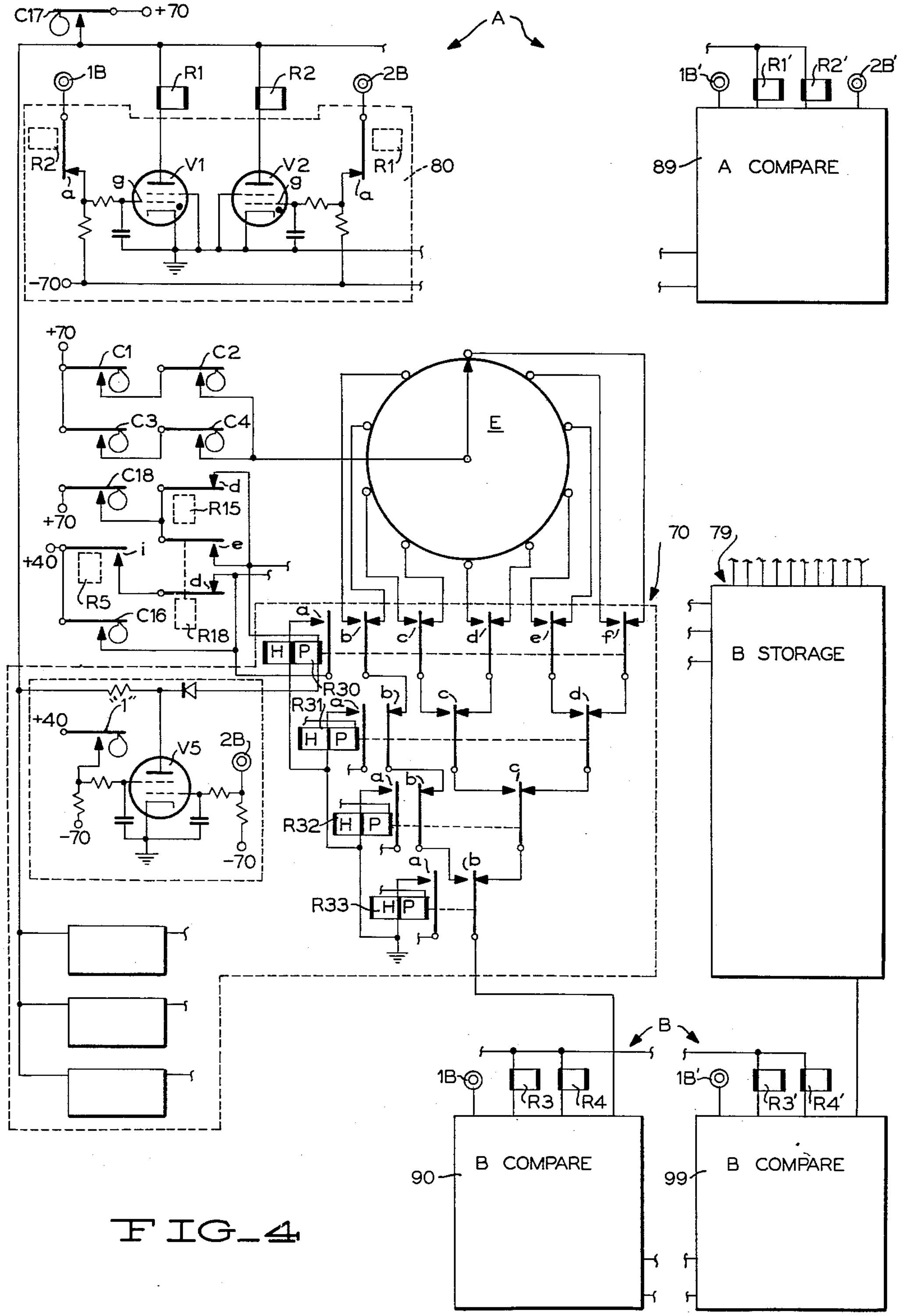
FIG. 4 is a schematic diagram of part of the A and B compare units and the B storage units of the collator.

Referring to FIG. 4, it will be seen that each of the A compare units 80–89 comprises a pair of comparison relays, such as relays R1—R2 through R1′—R2′. Since the circuitry for each of the A comparison units and also the B comparison units is substantially identical, only that of the first of the A comparison units will be shown in detail, it being realized that there is a similar comparison unit for each of the columns being compared, in each of the A and B units, the primed elements being representative of the low order units, and those of the comparison unit 80, for example, being representative of the first or high order of the A unit. The comparison relays R1 and R2 of the first column, for example, are controlled respectively by comparison thyratrons V1 and V2 having their control grids *g* connected to the first column brush terminals of the 1B and 2B brush stations, respectively, through contacts R2*a* n/c and R1*a* n/c, so that the comparison relay first picked, opens the operating circuit for the other comparison relay, and prevents its operation as a result of a lower order digit sensed at a later digit time. If equal digits are sensed by the 1B and 2B brushes, both relays R1 and R2 will be picked. The B compare units are shown as having similar comparison relays R3—R4 through R3′—R4′, corresponding to the relays of the A units.

Figure 5:
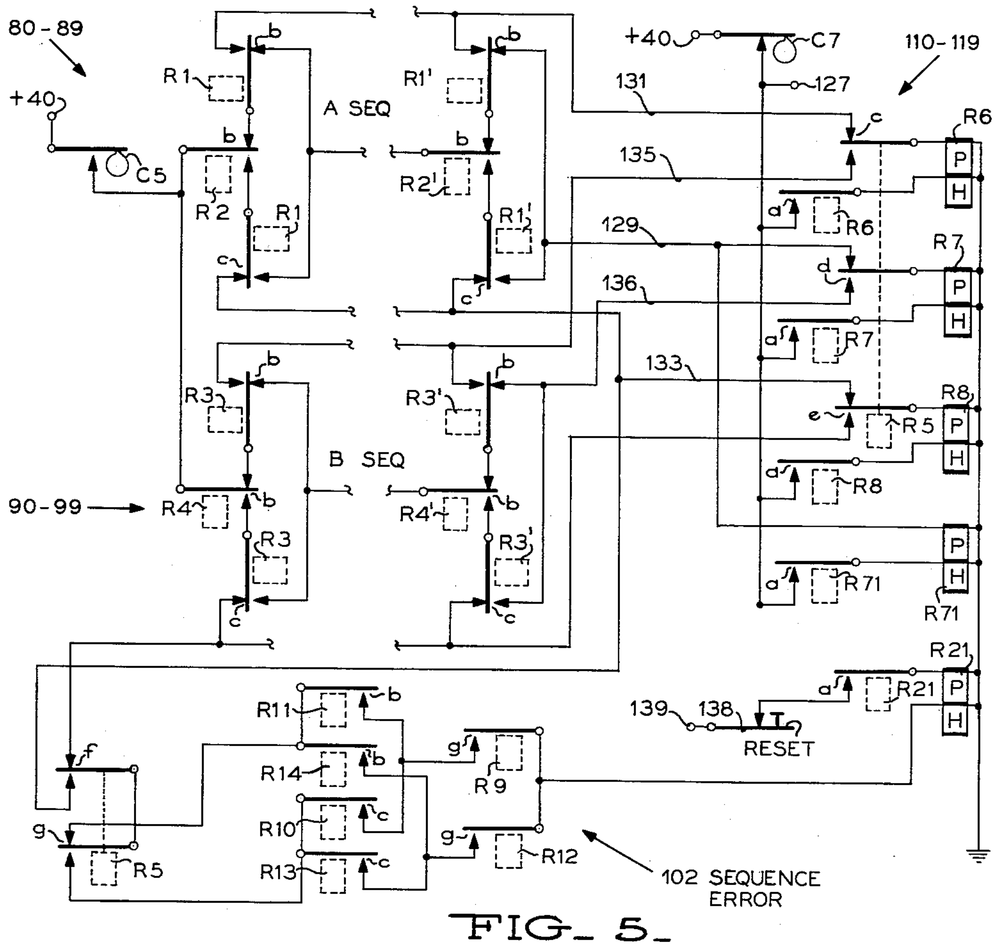
FIG. 5 is a schematic diagram of part of the A and B compare units, sequence control, error and compare output circuit units.

In order to provide for selectively connecting either the A or the B comparison unit to the compare unit output circuit, a storage indication relay R5 is provided, which operates under the control of the card register circuits to selectively switch the connections of low, equal and high comparison relays R6, R7 and R8, respectively, to sequence checking circuits of the A and B units as shown in FIG. 5. A hold circuit is provided through R5*a* n/o and terminal 141 to C11 in shunt with R18*c* n/c.

Figure 6:
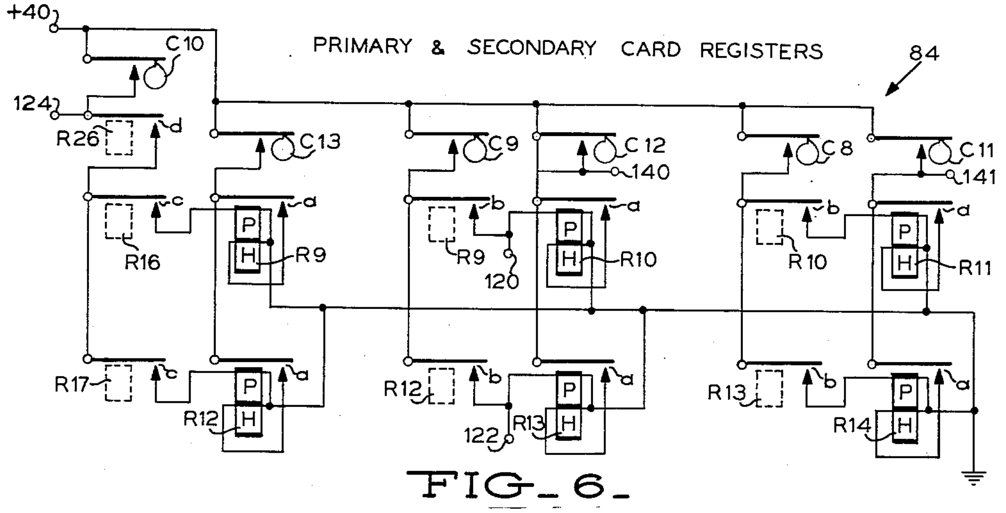
FIG. 6 is a schematic diagram of the card analyzer register relay circuits.

In order to determine the type of card, that is, whether it is a primary or a secondary card, in each of several positions including the 1B and 2B brush stations and therebeyond, either on its way to the pockets or to the storage position, relays R9, R10 and R11 are provided for indicating a primary card at the 1B brush, 2B brush or in the bypass position, respectively, while relays R12, R13 and R14 are provided for indicating a secondary card in a similar position as shown in FIG. 6.

Figure 7:
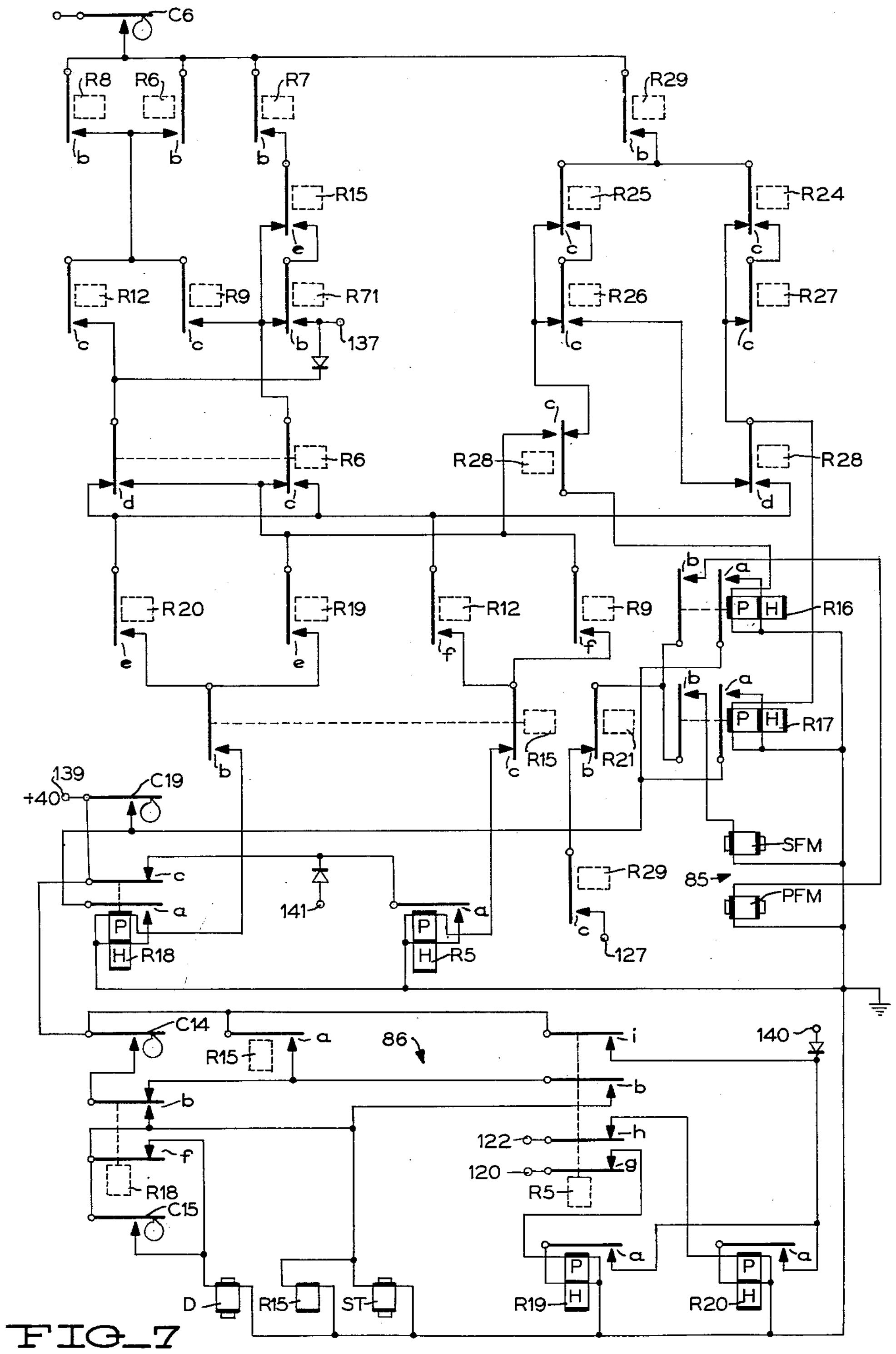
FIG. 7 is a schematic diagram of the primary and secondary feed, store and control circuits.

A relay R15 is connected in parallel with the store relay ST for indicating a card stored in the storage position. The primary feed magnet PFM is controlled by a primary clutch control relay R16; while secondary feed magnet SFM is controlled by a secondary clutch control relay R17 as shown in FIG. 7. Relay R18, also shown in FIG. 7, controls the release of a record card from storage. A relay R19 is connected in parallel with the primary register relay R10 through terminal 120, and provides for storing the indication of a primary card, as long as the card is in storage. A secondary relay R20 is connected through terminal 122 to relay R13, and performs the same function for a secondary card in storage. A hold circuit is provided for R19 and R20 through R19*a* n/o and R20*a* n/o, respectively, and terminal 140 to C12. Relay R21 is utilized to indicate a sequence error, and as shown in FIG. 5 is connected through reset key 138, terminal 139, and C19, and operates under the control of the B sequence unit while the A sequence unit is controlling the operation of the comparison output relays R6, R7 and R8 and vice versa. Relays R22—R28 are provided in conjunction with the primary and secondary hopper card lever contacts 40 and 42, the primary and secondary throat contact levers contacts 41 and 43, the 1B brush station lever contact 45, the secondary feed card lever contact 44 and the 2B brush station contact lever 46, respectively. A start relay R29 is controlled by a start key, and relays R71 and R72 are utilized as selection control relays to control the selection magnets S1, S2, S3, etc., for selectively operating chute blades 34—37. Relays R30—R33 are utilized as storage relays for storing in binary coded form data sensed by brush 2B in the B storage units 70—79.

IV.—CIRCUIT TIMING AND DEVICES

Figure 9:
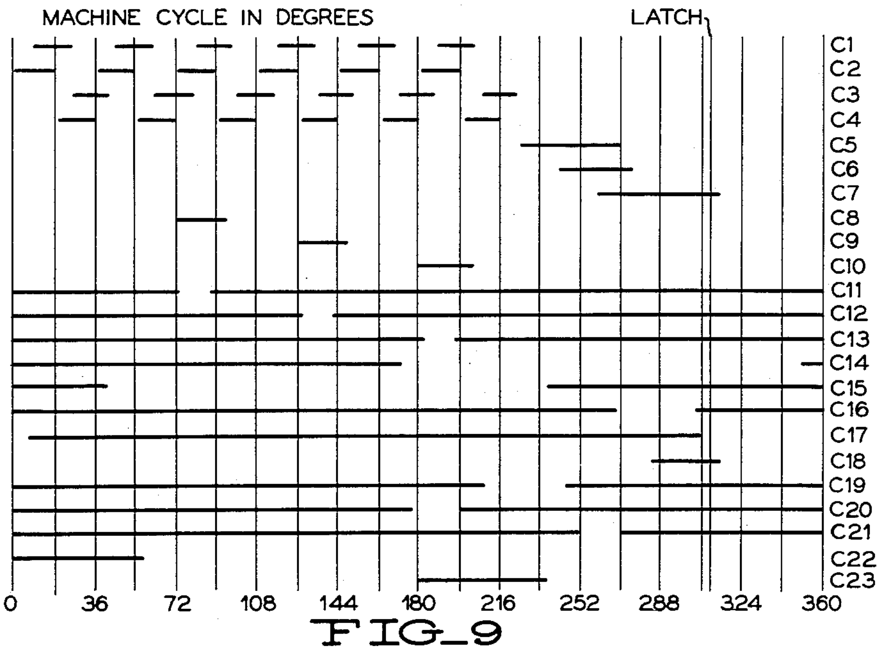
FIG 9 is a circuit breaker timing chart for the collator.
Figure 10:
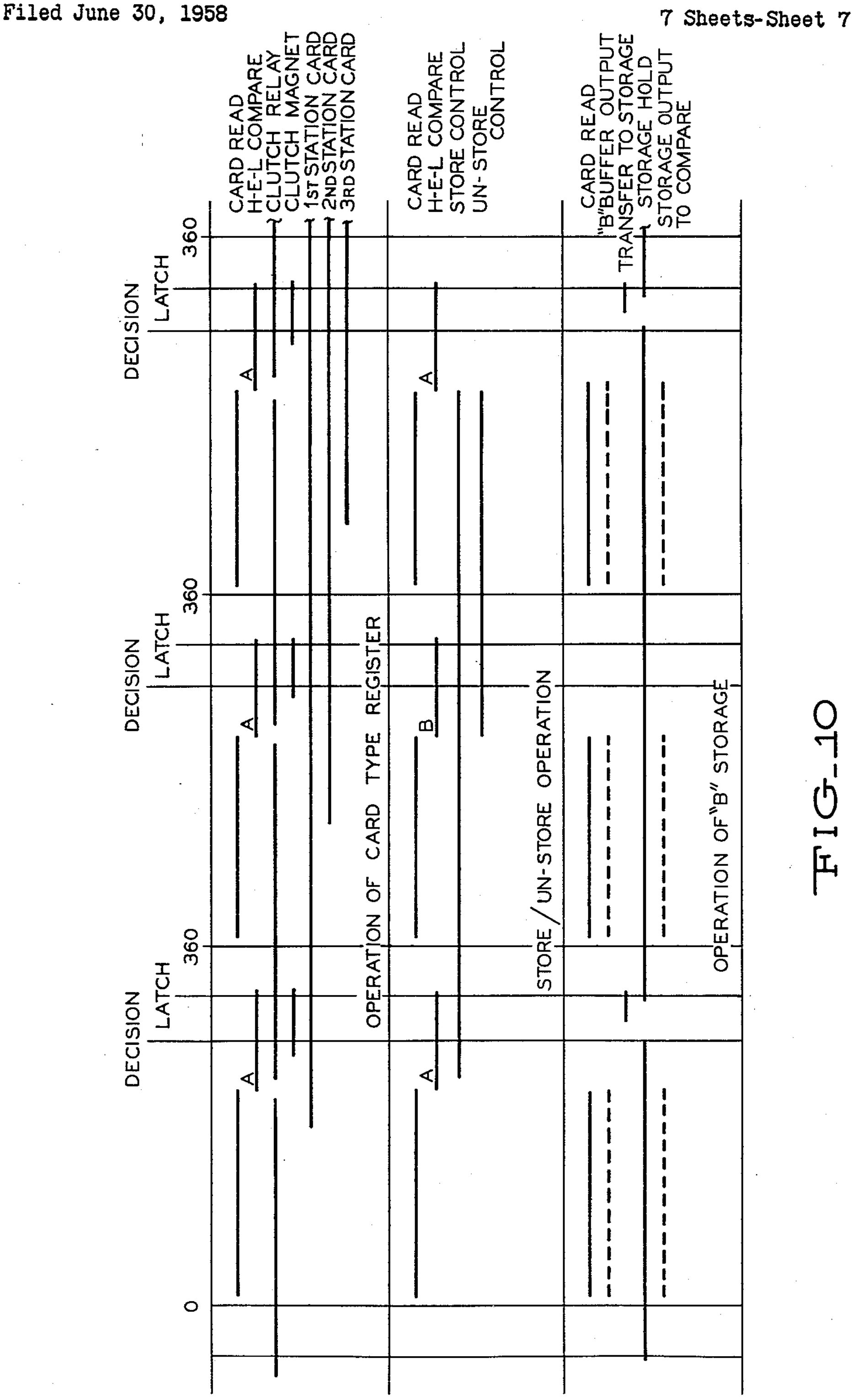
FIG. 10 is a three cycle timing diagram for the the collator.

Referring to FIG. 9, it will be seen that a plurality of master circuit breakers C1 through C4 are provided for producing digit pulses at the different digit times. Circuit breaker C5 produces a comparison test pulse for effecting operation of one of the comparison relays R6, R7 or R8, while circuit breaker C6 subsequently provides a clutch control pulse through contacts of relays R6, R7 or R8 for operating the feed control relays R16 and R17. Circuit breaker C7, with relays R16 and R17, controls the feed clutches. Circuit breakers C8, C9 and C10 advance the operation of the primary and secondary card type or feed register relays, while circuit breakers C11, C12 and C13 provide hold impulses for the card type register relays. The store magnet ST is controlled by circuit breaker C14, while the deflector magnet D is controlled by circuit breakers C14 and C15. Circuit breakers C16 and C18 provide for hold and transfer of the B storage information, while circuit breaker C17 provides for holding the compare relays R6, R7 and R8 to hold the comparison information. Circuit breaker C19 provides a hold for the store clutch relay R18, and circuit breaker C20 energizes the start-hold circuit. Circuit breakers C21, C22 and C23 are utilized to control selection control relay R72 and the pocket selector magnets S1, S2, S3, etc.

V.—B STORAGE CIRCUITS

B storage circuit unit 70, for example, comprises, as shown in FIG. 4, a tree of contacts of relays R30, R31, R32 and R33 for storing record card data in binary form. The relay R30, for example, is picked by a control or buffer tube V5 in response to data signal from 2B and an impulse from the "1" bit code cam which, as is well known in the art, closes at 1, 3, 5, 7 and 9 digit time, this pulse being applied to the screen grid *sg* and a pulse from the 2B brush which is applied to the control grid. Coincidence of a pulse from the 2B brush and the "1" bit code cam results in the tube V5 being rendered conductive to pick the relay R30 through contact **R15*d* when C18 closes. Relay R31 is similarly energized through the "2" bit code cam at 2 and 3 time, relay R32 from the "4" bit code cam at 4, 5, 6 and 7 time, and relay R33 from the "8" bit code cam at 8 and 9 time, all in conjunction with pulses from the 2B brush. An emitter E is provided for successively supplying timed digit pulses to the storage network during the next cycle for reading out of storage through the different circuits set up, digits thus stored, for application to the B compare circuit units 90—99 on subsequent cycles. If a card is in storage, contact R5*i* n/o provides a hold circuit around C16** to hold the data of a card as long as it remains in storage.

VI.—COMPARE CIRCUITS

Contacts of the compare relays R1—R2, etc., through R1'—R2' of the compare unit 80—89 are connected, as shown in FIG. 5, in a well-known manner for providing an A compare unit high, low or equal sequence comparison signal when circuit breaker C5 closes, for selectively energizing one or the other of the comparison relays R6, R7 or R8 of the compare unit output circuits 110—119. It will be realized that this network actually includes contacts for all of the columns of A comparison, only those (**R1*b*, R2*b*, R2*c*) for the first or high order column and (R1'*b*, R2'*b*, R1'*c***) last or low order column being shown, the intervening sets of contacts being omitted for purposes of simplification.

Immediately below the A sequence comparison network, a similar B sequence comparison network is shown, utilizing contacts of the B comparison relays R3—R4, etc., through R3'—R4'. These contacts likewise provide a comparison network for producing, in a well-known manner, a high, low or equal signal, which is applied to a sequence error detector circuit 102 shown immediately below, for controlling the operation of the error relay R21 whenever the A unit is used for sequence comparison. However, as hereinbefore described, contacts of the relay R5 are used to selectively control the connection of the relays R6, R7 and R8 at contacts **R5*c*, R5*d* and R5*e* to either the A sequence network or the B sequence network, depending on whether or not there is a card in storage. When there is a card in the storage, the comparison relays R6, R7 and R8 are controlled by the B sequence comparison network, and the error relay R21 is connected through contacts R5*f* and R5*g*** to be controlled by the A sequence network.

VII.—OPERATION OF MACHINE IN MERGING

*Table I*

| Primary Card | No. | Secondary Card | No. |
|---|---|---|---|
| 1 | P1 | 1 | S1-1 |
| 2 | P2 | 2 | S1-2 |
| 3 | P3 | 3 | S2-1 |
| ------ | ------ | 4 | S2-2 |
| ------ | ------ | 5 | S3-1 |
| ------ | ------ | 6 | S3-2 |

*Table II*

| Store | No. 2 | No. 1 | Compare | | Feed | Store | Unstore |
|---|---|---|---|---|---|---|---|
| | | | A | B | | | |
| ---- | P1 | S1-1 | E | L | P(P2) | ---- | ------ |
| ---- | S1-1 | P2 | L | L | S(S1-2) | ---- | ------ |
| ---- | P2 | S1-2 | H | E | S(S2-1) | X | ------ |
| P2 | S1-2 | S2-1 | L | E | P | ---- | X |
| ---- | S2-1 | P3 | L | L | S | ---- | ------ |
| ---- | P3 | S2-2 | H | E | S | X | ------ |
| P3 | S2-2 | S3-1 | L | E | P | ---- | X |
| ---- | S3-1 | P4 | -- | -- | -------- | ---- | ------ |

Figure 8:
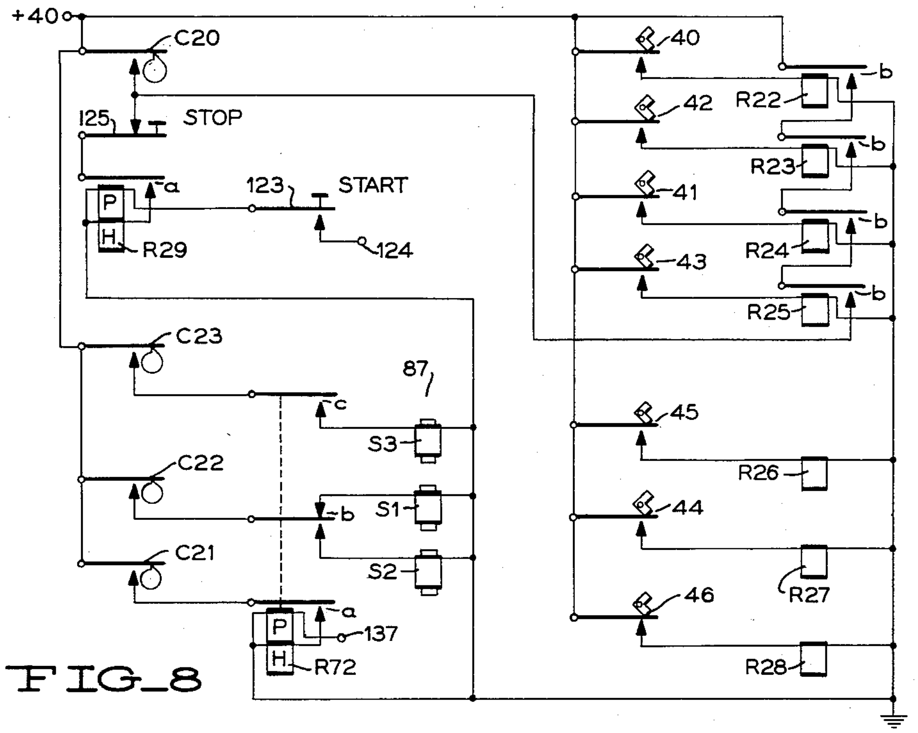
FIG. 8 is a schematic diagram of the selection and card lever control circuits.

For a merging operation with primary and secondary cards as indicated in columns 1 and 3 of Table I and having values indicated in columns 2 and 4 thereof, the start button 123 in FIG. 8 is pushed, and when circuit breaker C10 closes at 126°, a circuit is completed for relay 29 through terminal 124 and a hold circuit is provided through contact **R29*a* n/o, the stop button 125 and circuit breaker C20 until 178° of the first card cycle, at which time the primary and the secondary throat relays R24 and R25 will be energized by cards operating lever contacts 41 and 43, providing a holding circuit for R29 through contact R29*a* n/o, stop button 125 and normally open contacts R25*b*, R24*b*, R23*b* and R22*b* to the positive side of the line. Relays R16 and R17 are both picked during the first feed cycle, the circuit for R16 extending from circuit breaker C6 through contact R29*b* n/o and contact R25*c* n/o, contact R26*c* n/c and contact R28*c* n/c to the pick coil of relay R16. A holding circuit is provided through contact R16*a* and circuit breaker C19. At the same time, a circuit is provided for relay R17 through contact R24*c* n/o, contact R27*c* n/c to the pick coil of relay R17. Contacts R16*b* n/o and R17*b* n/o provide obvious energizing circuits through contacts R21*b* n/c, R29*c* n/o and terminal 127 to C7 (FIG. 5) for the primary and secondary feed relays PFM and SFM** causing a card to be fed in each of the primary and secondary feeds (primary card P1 and secondary card S1–1).

The primary and secondary throat relays R24 and R25 are energized at the end of the first feed cycle, after lever contacts 41 and 43 are operated by cards fed from the hoppers. Circuits are provided through R24*c* n/o and R25*c* n/o for R17 and R16 to provide secondary and primary card feeds for the second feed cycle. Relays R26 and R27 are operated at the end of the second cycle when cards reach the 1B brush and the secondary feed card lever contact 44, respectively. Operation of relay R26 now forces a secondary feed for the third cycle, since contact R26*c* transfers and provides parallel energizing circuits for relay R17 through R24*c* n/o and R25*c* n/o, while opening the original circuit for relay R16. This advances P1 to 2BR, S1–1 to 1BR and feeds S1–2. Relay R28 picks at the end of the third cycle after card P1 reaches the 2B brush station and operates lever 46, causing transfer of the primary and secondary clutch control circuits from the starting to the comparison circuits at contacts R28*c* and R28*d*.

If a throat jam occurs, a respective primary or secondary throat lever contact 41 or 43 will return to normal and de-energize its associated relay R24 or R25 to interrupt the hold circuit for R29, which opens the primary and secondary feed circuits at R29*c*. Operations may be recommenced by hitting the start key after the cards have been cleared to restart in the usual manner.

Since the primary and secondary cards P1 and S1–1 are equal, compare relays R1 and R2 will both be picked during the third cycle, and when circuit breaker C5 closes after digit twelve time, a circuit is provided to pick the equal relay R7, extending from the plus side of the line through circuit breaker C5, contact R2*b* n/o, contact R1*c* n/o through the sequence network to contact R2'*b* n/o and contact R1'*c* n/o to the equal line 129 and relay R7 through contact R5*d* n/c (FIG. 5).

A circuit is provided (FIG. 7) for the primary feed control relay R16 during fourth cycle when the circuit breaker C6 closes, extending from the positive side of the line through circuit breaker C6, contact R7*b* n/o, contact R15*e* n/c, contact R6*c* n/c and contact R28*c* n/o to the pick coil of relay R16. R16 is energized and provides an obvious circuit for the primary feed magnet PFM (FIG. 7) through contact R16*b* n/o, contact R21*b* n/c, contact R29*c* n/o, terminal 127 to positive through circuit breaker C7 (FIG. 5). The equal pulse is not applied to relay R72 through terminal 137, since contact R15*e* and contact R71*b* are open. Accordingly, a circuit is provided for select magnet S1 through contact R72*b* n/c, and the first card P1 is fed to pocket PK2. If two successive card feeds are of the same card type, relay R9 will be picked and the primary feed signal will also be applied through contact R9*f* n/o, contact R15*c* n/c to pick the store control relay R5. A card in storage is unstored when the feed is the same type as the card in storage.

Energization of the primary feed magnet PFM feeds primary card P2 for the fourth cycle and this compared with secondary card S1–1 at 2BR gives a low comparison, so that comparison relay R1 picks when circuit breaker C17 closes. A circuit (FIG. 5) for the low comparison relay R6 is provided when circuit breaker C5 closes, through contacts R2*b* n/c, R1 n/o and the low conductor 131 through contact R5*c* n/c to relay R6. Relay R6 operates and provides energizing circuit (FIG. 7) for the secondary feed control relay R17 in the fifth cycle, from circuit breaker C6 through contact R6*b* n/o, contact R9*c* n/o (since the previous card fed was a primary card), contact R6*c* n/o, contact R28*d* n/o to relay R17. Relay R17 provides a circuit for the secondary feed magnet SFM through contacts R17*b* n/o and R21*b* n/c when circuit breaker C7 closes.

Secondary card S1–2 is now fed during the fifth cycle, and S1–1 follows P1 into PK2. With primary card P2 at 2BR this gives a high comparison, causing relay R2 to pick. This sets up a circuit for the high comparison relay R8, through circuit breaker C5, contact R2*b* n/o, contact R1*c* n/c and the high conductor 133 through contact R5 n/c to relay R8. Relay R8 sets up a circuit from circuit breaker C6 through contact R8*b* n/o, contact R12*c* n/o (since a secondary card was previously fed), contact R6*d* n/c, contact R28*d* n/o to relay R17. Relay R17 provides a circuit through contact R17*b* n/o for the secondary feed magnet SFM to feed S2–1 in the sixth cycle.

A circuit is also provided through contact R6*d* n/o and contact R12*f* n/o, contact R15*c* n/c to the store control relay R5. When the store clutch circuit breaker C14 closes, a circuit is provided through contact R18*b* n/c, contact R5*b* n/o to energize the store relay ST and relay R15. The deflector relay D is also energized through contact R5*b* and contact R18*f* n/c to deflect the following card upwards between feed rolls 27 and 29, while the primary card remains at rest between the now separated feed rolls 28 and 29. C15 provides a hold circuit for D in shunt with contact R18*f*. A hold circuit is also provided for relay R5 through contact R5*a* n/o and contact R18*c* n/c. Secondary card S2–1 is fed during the sixth cycle and primary card P2 is stored, as contact R5*b* provides a circuit for relay R15, the store relay ST and deflector relay D when circuit breaker C14 closes. A hold circuit is provided through contact R15*a*. Secondary card S1–2 is advanced to 2B.

Since relay R5 operates, the compare relays R6, R7 and R8 are now connected to be selectively energized through contacts R5*c*, R5*d* and R5*e* n/o from the B sequence control unit, and the A sequence control unit is connected at contact R5*f* n/o to the sequence error circuit for effecting operation of the error relay R21 in response to a sequence error.

The comparison of primary card P2 in storage and secondary cards S2–1 gives an equal comparison reading between 1B and B storage and relays R3 and R4 pick. When circuit breaker C5 closes, the equal comparison relay R7 is picked through contact R4*b* n/o, contact R3*c* n/o, contact R4'*b* n/o and contact R3'*b* n/o, the equal conductor 136 through contact R5*c* n/o. Relay R7 completes a hold circuit through R7*a* n/o and sets up a circuit for the primary feed control relay R16 when circuit breaker C6 closes, through contact R7*b* n/o, contact R15*e* n/o, contact R71*b* n/c and contact R28*c* n/o to relay R16. Relay R16 completes an obvious energizing circuit for the primary feed relay PFM for the seventh cycle through contact R16*b* n/o, contact R21–2 n/c and circuit breaker C7 to feed primary card P3. S1–2 is advanced to pocket PK2.

Relay R18 is energized to unstore the primary card P2, through a circuit extending through contacts R6*c* n/c, R19*e* n/o and R15*b* n/o, relay R19 being picked up through breaker C9, contacts R9*b* n/o and R5*g* n/c with relay R10. Primary card P2 follows secondary card S1–2 into the pocket. Primary card P3 is now compared with secondary card S2–1 through compare unit A, as relay R5 is de-energized when the unstore relay R18 operates and contact R18*c* opens and reconnects compare relays R6, R7 and R8 to the A compare unit at contacts R5*c*, R5*d* and R5*e*. This gives a low comparison, so relay R1 picks to provide a circuit for the low comparison relay R6 through circuit breaker C5, contact R2*b* n/c, contact R1*b* n/o and the low conductor 131 through contact R5*c* to relay R6.

Relay R6 sets up a circuit for the secondary feed control relay R17 through contact R6*b* n/o, contact R9*c* n/o, contact R6*c* n/o, contact R28*d* n/o to relay R17. Relay R17 operates and provides an obvious energizing circuit for the secondary feed control relay through contact R17*b* when circuit breaker C7 closes, and secondary card S2–1 is merged. The circuit to store relay R5 is opened at R6*c* n/c.

Likewise, secondary card S2–2 is fed for the eighth cycle, and comparison with primary card P3 gives a high reading so that the high comparison relay R8 is picked, and provides a circuit for the secondary feed control relay R17, to effect another secondary feed in the ninth cycle, this time of secondary card S3–1. Since consecutive feeds were both secondary, the low signal is fed to the store control magnet R5 as before, and the primary card P3 is stored. A comparison of secondary card S2–2 and secondary card S3–3 through the B comparison sequence network provides a low reading, and therefore a circuit is provided for the primary feed relay R16 to give a primary feed for the tenth cycle and energizes the unstore magnet R18, as hereinbefore described. The cards will be merged as follows: P1, S1–1, S1–2, P2, S2–1, S2–2, P3, etc.

VIII.—OPERATION OF MACHINE IN SELECTING AND REPLACING SELECTED FILE CARDS

*Table III*

| Primary Card | No. | Secondary Card | No. |
|---|---|---|---|
| 1 | P1 | 1 | P2–1 |
| 2 | S1–1 | 2 | P3–1 |
| 3 | S1–2 | ------ | ------ |
| 4 | P2 | ------ | ------ |
| 5 | S2–1 | ------ | ------ |
| 6 | S2–2 | ------ | ------ |
| 7 | P3 | ------ | ------ |
| 8 | S2–1 | ------ | ------ |
| 9 | S3–2 | ------ | ------ |

*Table IV*

| Store | No. 2 | No. 1 | Compare | | Feed | Store | Unstore |
|---|---|---|---|---|---|---|---|
| | | | A | B | | | |
| ------ | P1 | P2–1 | L | L | P | ---- | ------ |
| ------ | P2–1 | S1–1 | H | E | P | x | ------ |
| P2–1 | S1–1 | S1–2 | E | H | P | ---- | ------ |
| P2–1 | S1–2 | P2 | L | E | P | ---- | ------ |
| P2–1 | P2 | S2–1 | E | E | S | ---- | x |
| ------ | S2–1 | P3–1 | L | L | P | ---- | ------ |
| ------ | P3–1 | S2–2 | H | E | P | ---- | ------ |
| P3–1 | S2–2 | P3 | L | E | P | ---- | ------ |
| P3–1 | P3 | S3–1 | E | E | S | ---- | x |

With the machine as hereinbefore described, the feed rules for merging are as follows:

FOLLOWING A SECONDARY FEED

| No Card in Storage Station | Card in Storage Station |
|---|---|
| #2 Read LO-Feed PRI.<br>#2 Read HI-Feed SEC.<br>EQUAL—Feed PRI. | Storage Card LO-Feed PRI.<br>Storage Card HI-Feed SEC.<br>EQUAL—Feed PRI. |

FOLLOWING A PRIMARY FEED

| No Card in Storage Station | Card in Storage Station |
|---|---|
| #2 Read LO-Feed SEC.<br>#2 Read HI-Feed PRI.<br>EQUAL—Feed PRI. | Storage Card LO-Feed SEC.<br>Storage Card HI-Feed PRI.<br>EQUAL—Feed PRI. |

IX.—OPERATION OF MACHINE IN PULLING AND REPLACING SELECTED FILE CARDS

When using the machine for pulling primary cards and substituting new cards for them, the operation is performed on the first card of the group only, and a change in the operating rule is made so that instead of providing a primary feed whenever an equal signal is provided by the A or B comparison unit as when merging, a secondary feed is provided whenever both the A and B units show an equal comparison. This is accomplished by utilizing the A comparison equal output signal for picking R72 and energizing R71 (FIG. 5, contact R71*b* n/o to terminal 137, FIG. 7). This occurs when a card is stored and A and B compare equals exist simultaneously. The card to be pulled is in the bypass station, and the pulling card to be substituted is in the store station. With R72 deenergized, all unselected cards pass to PK2. When R72 is energized, R72*b* transfers, and the card to be pulled passes to PK3 with the pulling card taking its place in PK2. Otherwise, the operation is substantially as hereinbefore described, it being understood that the new cards which are to be substituted are contained in the secondary file, even though they are designated as primary cards, and the previously merged primary and secondary cards comprising the file are placed in the primary hopper.

For example, operation of the start key 123 results in primary and secondary feeds in each of the first and second cycles followed by a secondary feed in the third cycle as described hereinbefore.

P1 and P2–1 are read and compared, giving a low comparison and calling for a primary feed on the fourth cycle. P1 passes on to the stacker.

The primary feed advances S1–1 through 1B and it is read and compared with P2–1, resulting in a high comparison, which calls for P2–1 to be stored and a primary feed.

In the fifth cycle, P2–1 is held in storage, S1–1 is read by 2B and P2–1 is compared with S1–2 at 1B, since the B compare unit makes the comparison. This results in a high comparison and calls for a primary feed. S1–1 goes on to the stacker pocket PK2.

In the sixth cycle, P2 is read by 1B and compared with P2–1, giving an equal comparison. S1–2 goes on to the stacker pocket PK2.

The A and B compare equal outputs cause R71 to pick and complete a circuit through R71*b* to pick R72 (FIGS. 7 and 8). R72 picks and energizes S2 through R72*b* n/o, causing P2 to go into PK3 followed by P2–1 which goes into PK2 after S1–2.

Cards are filed in PK2 in the following order: P1, S1–1, S1–2, P2–1, S2–1, S2–2, P3–1, S3–1, S3–2 and P2 and P3 go into PK3 in that order.

From the above description and the accompanying drawings, it will be realized that I have provided in accordance with the teachings of the present invention a simplified form of a collator wherein a common card feed with a single pair of reading stations is used for both the primary and the secondary cards, and means is provided for storing selected cards at rest in the common feed while other cards are bypassed around the stored card.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a record card collator, a pair of means for reading data on record cards, common feed means for advancing primary and secondary record cards in seriatim past said data reading means, means including additional feed means for advancing primary and secondary cards to the common feed means, means controlled by the additional feed means for storing a record card in the common feed during transit and for bypassing a subsequent record card by a stored card, and comparing means selectively connected under the control of the storing means for selectively effecting operation of the primary and secondary feed means.

2. A record card collator comprising, a pair of means for reading data on record cards, common feed means for advancing primary and secondary cards past said reading means, data storage means connected to one of said reading means, data comparing means, means for storing a record card in a portion of said common feed, means for directing a subsequent card past the stored card, means including primary and secondary feed means for advancing record cards to said common feed means, control means for controlling said storing means and directing means under the control of the primary and secondary feed means, and means controlled by the card storing control means for selectively controlling connection of the data comparing means, the reading means and data storage means to selectively effect operation of the primary and secondary feed means.

3. In a record card machine of the type described, a common record card feed having a pair of means for reading data on record cards, data storage means connected with one of said reading means for storing data read by said one reading means, means including primary and secondary card feeding means for advancing primary and secondary cards to said common feed, data comparing means, means selectively connecting the data comparing means, the data reading means and the data storage means in accordance with operation of the primary and secondary card feed means, and means controlled by the data comparing means for selectively effecting operation of the primary and secondary feed means.

4. A record card machine comprising, a common record card feed having a pair of means for reading data on record cards, record card data comparing means, means including primary and secondary record card feed means operable to advance record cards to said common feed, means in said common card feed operable to hold a record card at rest, control means operable to bypass another record card around a card in said holding means, means controlled by the primary and secondary feed means for effecting operation of the holding means and control means, and circuit means controlled by the holding means for selectively effecting connection of the comparing means to effect operation of the primary and secondary record card feed means.

5. A record card collator comprising, a common record card feed having a pair of means for reading data on record cards, means including primary and secondary record card storage means and feeds for advancing cards to said common feed, means for storing a card at rest in a portion of the common card feed beyond said reading means and bypassing a subsequent card around the stored card, data comparing means for selectively effecting operation of the primary and secondary feed means, data storage means connected to one of the reading means, means controlled by the primary and secondary feed means for selectively effecting operation of the card storing and bypassing means, and means controlled by the storing means for selectively connecting the comparing means to compare data from the reading means or from one reading means and the data storage means.

6. In a record card collator, separate primary and secondary card storage means and feed means, a common card feed having a first and a second means for reading data on record cards, data storage means connected to the second reading means for storing read card data, primary and secondary card registers operated by the feed means for registering which of the primary and secondary feed means operates, card storage means in the common card feed controlled by the registers for holding a record card at rest, means operable under control of the registers to bypass a subsequent record card past a held card, and data comparison means selectively connected to the reading means and the data storage means under the control of the card storage means for selectively operating the primary and secondary card feed means.

7. In a record card collator, a common feed having a pair of means for reading data on record cards and card storage means for holding a record card at rest with means for feeding a subsequent record card past the held card, record card data storage means operated from one of the reading means, record card data comparing means, means selectively controlled by the card storage means for selectively effecting connection of the comparing means, reading means and data storage means, primary and secondary card registers, means including primary and secondary card feed means for advancing cards to said common feed and operating said registers, and means responsive to a high comparison by the comparing means following either a primary or secondary feed effecting operation of the feed means in accordance with said registers for repeating operation of such feed.

8. A record card collator comprising; a common record card feed having a pair of means for reading data on record cards and record card storage means operable to hold a record card at rest; means including a deflector for feeding a subsequent record card about a stored card; record card data storage means connected to be operated by one of the reading means; record card data comparing means selectively connected under control of the said storage means for producing a high, low or equal comparison signal from comparing data from one of the reading means and the data storage means when a record card is stored; means including primary and secondary card feeds for supplying cards to said common feed; primary and secondary card registers controlled by the primary and secondary feeds for registering the type of record fed; and means controlled by the comparing means and registers responsive to a high comparison signal following either a primary or a secondary feed for repeating operation of such feed and effecting operation of the record card storage means.

9. In a record card collator; a common feed for record cards having a first and a second record means for reading data on cards; means including primary and secondary card feeding means for advancing cards to said common feed; card storage means in said common feed operable to hold a card at rest; means for passing a subsequent card ahead of the card at rest; record card data comparing means operated by the reading means to produce high, low or equal comparison signals; register means operated by the feeding means; and means controlled by the data comparing means and the register means for effecting operation of a different one of the primary and secondary feeds in response to a low comparison signal.

10. A record card machine comprising, a common record card feed having a first and a second means for reading data on record cards, means in said common feed operable to store a card at rest, means for by-passing a subsequent card around a stored card, separate primary and secondary record card storage means and feeds for advancing cards to the common feed, data storage means connected to store data read by the second reading means, data comparing means for producing a high, equal or a low comparison signal, means controlled by the card storage means for selectively connecting the comparing means to the reading means and the data storage means, primary and secondary card register means operated by their respective card feeds for determining the nature of cards fed, and means controlled by the data comparing means and the register means for effecting operation of the primary card feed in response to an equal comparison signal.

11. In a record card collator, a first and a second means for reading data on record cards, a continuous common record card feed for advancing record cards past said reading means having card storage means operable to hold a record card at rest and means including a deflector for bypassing a following card around the card at rest, separate primary and secondary record card storage and feeding means operable to advance cards to said common feed, circuit means including data storage means connected to the second one of said reading means, data comparing means, means controlled by the card storage means for selectively connecting the data comparing means to both the reading means or the first reading means and the data storage means, primary and secondary card register means operated by the primary and secondary feed means for registering primary and secondary feeds of cards, and circuit means selectively effecting operation of the primary and secondary feed means under control of the comparing means and the register means.

12. In a record card collator, a pair of means for reading data on record cards, a continuous common record card feed for advancing record cards past said reading means, said common card feed having means for stopping a portion of the feed to store a card at rest and means for bypassing a subsequent card about said card at rest, separate primary and secondary record storage means and card feeds operable to advance record cards to said common feed, data storage means electrically connected to the second reading means of said pair, primary and secondary register means operated by their respective feed means to register the type of card at predetermined points in said common feed, and circuit means controlled by the data comparing means and the register means for effecting selective operation of the primary and secondary feed means.

13. A record card collator comprising, first and second means for reading data on record cards, a common record card feed for advancing record cards past said reading means, card storage means in said feed operable to hold a card at rest, means including a deflector operable to bypass a following card about a card at rest in the storage means, means including primary and secondary card feed means operable to advance cards to the common feed means, and means including register means operated by the feed means for selectively effecting operation of the card storage means and deflector to store and unstore record cards.

14. In a record card collator, a common card feed having a pair of means for reading data on record cards, means including separate primary and secondary card feeding means for advancing cards to the common feed, means for storing a card at rest in said common feed, means operable to bypass a card about a stored card, record card data comparing means, card register means responsive to the feeding means, means operated by the feeding means for operating the storage means and bypass means, and means jointly controlled by the storage means, comparing means and register means for selectively controlling said primary and secondary feeding means.

15. In a record card machine, first and second means for reading data on record cards, a continuous common record card feed for advancing record cards past said reading means, card storage means in said feed operable to hold a record card at rest, means including a deflector operable to bypass a subsequent card around a card at rest, primary and secondary card storage and feed means operable to advance cards to said common feed, record card data comparing means operated from said reading means, primary and secondary register means operable in accordance with their respective feeds, means controlled by the register means and the comparing means for effecting selective control of the primary and secondary feed means, and circuit means controlled by the register means for effecting selective operation of the storage means and deflector means.

References Cited in the file of this patent

UNITED STATES PATENTS

| | | |
|---|---|---|
| 2,359,670 | Page | Oct. 3, 1944 |
| 2,531,874 | Dean | Nov. 28, 1950 |
| 2,602,545 | Luhn | July 8, 1952 |
| 2,866,550 | Nelson | Dec. 30, 1958 |